United States Patent
Chukka et al.

(10) Patent No.: US 10,165,451 B1
(45) Date of Patent: *Dec. 25, 2018

(54) CONTROLLING COVERAGE IN A WIRELESS COMMUNICATIONS NETWORK

(71) Applicant: Sprint Communications Company L.P., Overland Park, KS (US)

(72) Inventors: Chaitanya Chukka, Schaumburg, IL (US); Andrew Mark Wurtenberger, Olathe, KS (US); Wilbur E. Hill, Lee's Summit, MO (US); Patrick Jacob Schmidt, Basehor, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 15/634,642

(22) Filed: Jun. 27, 2017

Related U.S. Application Data

(63) Continuation of application No. 14/869,453, filed on Sep. 29, 2015, now Pat. No. 9,736,846.

(51) Int. Cl.
| | | |
|---|---|---|
| *H04W 16/26* | (2009.01) | |
| *H04W 16/28* | (2009.01) | |
| *H04W 72/00* | (2009.01) | |

(52) U.S. Cl.
CPC .......... *H04W 16/26* (2013.01); *H04W 16/28* (2013.01); *H04W 72/00* (2013.01)

(58) Field of Classification Search
CPC ...... H04W 16/26; H04W 16/28; H04W 72/00
USPC ..................... 455/452.1, 449, 453
See application file for complete search history.

(56) References Cited

U.S. PATENT DOCUMENTS

| | | | | |
|---|---|---|---|---|
| 5,163,176 A | * | 11/1992 | Flumerfelt | ............ G01S 7/2813 342/174 |
| 5,245,347 A | * | 9/1993 | Bonta | ................... G01S 7/2813 342/149 |
| 7,120,431 B1 | | 10/2006 | Huo et al. | |
| 7,565,169 B1 | * | 7/2009 | Theobold | ............ H04W 64/006 342/147 |
| 8,073,452 B2 | * | 12/2011 | Kossi | .................... H04W 84/18 455/450 |
| 2003/0058165 A1 | | 3/2003 | Li et al. | |
| 2005/0275597 A1 | | 12/2005 | Tian et al. | |
| 2009/0073072 A1 | | 3/2009 | Lindenmeier et al. | |
| 2009/0128433 A1 | | 5/2009 | Lawlor et al. | |
| 2009/0135074 A1 | | 5/2009 | Yang et al. | |
| 2010/0311457 A1 | | 12/2010 | Johansson et al. | |
| 2011/0151932 A1 | * | 6/2011 | Kim | ....................... H01Q 3/005 455/562.1 |
| 2012/0129575 A1 | | 5/2012 | Kenington | |
| 2012/0162008 A1 | | 6/2012 | Eom et al. | |

(Continued)

*Primary Examiner* — Mong-Thuy T Tran

(57) ABSTRACT

Devices, systems, and methods for providing improved network performance in wireless communications networks using intelligent radiation selection are provided. A radio is communicatively coupled to an antenna and configured to provide a signal to the antenna for broadcast from a cell site. One or more input components are communicatively coupled to the radio to provide information on at least one of an internal or an external condition of the antenna, so that the radio can adjust or modify the signal provided to the antenna to change an emitted pattern of radiation from the antenna to reduce signal loss, or recover or help maintain an area of coverage provided by the antenna.

19 Claims, 4 Drawing Sheets

(56) References Cited

U.S. PATENT DOCUMENTS

| | | |
|---|---|---|
| 2013/0116011 A1 | 5/2013 | Lee et al. |
| 2013/0235807 A1* | 9/2013 | Lee .................. H04W 16/28 370/329 |
| 2014/0274094 A1 | 9/2014 | Abdelmonem et al. |
| 2014/0295782 A1 | 10/2014 | Rousu et al. |
| 2016/0105806 A1* | 4/2016 | Noerpel ................ H04B 7/185 455/12.1 |

* cited by examiner

CONTROLLING COVERAGE IN A WIRELESS COMMUNICATIONS NETWORK

CROSS-REFERENCE TO RELATED APPLICATIONS

This U.S. Non-Provisional Patent Application is a Continuation that claims priority to co-pending U.S. Non-Provisional patent application Ser. No. 14/869,453, filed Sep. 29, 2015, titled "Intelligent Radiation Selection for Antennas in a Wireless Communications Environment," the contents of which is incorporated herein by reference in its entirety.

TECHNICAL FIELD

The field of the invention relates to wireless communications networks, and more specifically, to control of radiation emitted from antennas used in wireless communications networks.

BACKGROUND

Antenna radiation is an important factor in defining a radius of cell coverage for a cell site. The radius, or coverage footprint, is often modeled using a planning tool at set-up to optimize various parameters of the antenna (e.g., down tilt, azimuth, etc.) to provide desired coverage for the cell site.

Many larger antenna platforms have stabilizing structures or features that help to limit changes in antenna position during operation, to prevent loss of coverage. However, certain cell site deployments are often installed and utilized with fewer stabilizing structures or features (e.g., small cells in between macro cells), and as a result, may suffer from decreased performance due to environmental factors such as wind, temperature, atmospheric conditions, and/or terrain variation affecting the position and orientation of the antenna, which may affect the coverage area of the cell site.

Shifting or degraded coverage area can cause dropped or blocked calls, handoff issues, improper coverage, fluctuating radio frequency waves, or other undesirable network irregularities, unless the antenna is physically repositioned or readjusted. Accordingly, a new, reliable, and dynamic process for adjusting antenna radiation during operation is needed. The present invention addresses these issues, among others.

SUMMARY

This summary is provided to introduce a selection of concepts in a simplified form that are further described below in the detailed description section of this disclosure. This summary is not intended to identify key or essential features of the claimed subject matter, nor is it intended to be used as an aid in determining the scope of the claimed subject matter. The scope of the invention is defined by the claims.

In brief, and at a high level, this disclosure describes, among other things, methods and systems for intelligent radiation selection in a wireless communications network. More specifically, this disclosure describes methods and systems for controlling, adjusting, and/or optimizing a pattern of radiation emitted by an antenna through modification of a signal provided to the antenna from a radio, in addition to other possible modifications.

In a general embodiment, a radio generates a signal, and an antenna is communicatively coupled to the radio and receives the signal from the radio. Additionally, one or more input components that measure internal and/or external conditions associated with the antenna are communicatively coupled to the radio. The input components may continuously or selectively provide information on the internal or external conditions to the radio, so that the radio may utilize the information to dynamically adjust or modify the signal provided to the antenna to adjust a size, angle, and/or area of coverage of the antenna, or rather, adjust an emitted pattern of radiation from the antenna, to optimize and maintain network coverage. This process may be used separately or in conjunction with physical adjustments to the antenna.

In one embodiment of the invention, a system for improved antenna coverage in wireless communications networks is provided. The system comprises a radio, an antenna communicatively coupled to the radio, and one or more input components communicatively coupled to the radio and configured to receive information on at least one of an internal or an external condition of the antenna. The information is communicated to the radio, and the radio is configured to adjust a signal provided to the antenna based on the information to modify an area of coverage of the antenna.

In a second embodiment of the invention, a method for providing improved antenna coverage in wireless communications networks is provided. The method comprises providing an antenna, communicatively coupling a radio to the antenna that provides a signal to the antenna, and communicatively coupling one or more input components to the radio. The input components are configured to receive information on at least one of an internal and an external condition of the antenna. The information is communicated to the radio, and the radio is configured to adjust the signal provided to the antenna based on the information to modify an area of coverage of the antenna.

In a third embodiment of the invention, a method for controlling antenna radiation in wireless communications networks is provided. The method comprises providing an antenna, communicatively coupling a radio to the antenna, the radio providing a signal to the antenna, communicatively coupling one or more input components to the radio, the input components configured to receive information on at least one of an internal and an external condition of the antenna, receiving the information at the one or more input components, communicating the information from the one or more input components to the radio, and adjusting the signal provided to the antenna based on the information to modify an area of coverage of the antenna.

Throughout this disclosure, several acronyms and shorthand notations may be used to aid the understanding of certain concepts pertaining to the associated network system, services, and devices. These acronyms and shorthand notations are intended to help provide an easy methodology of communicating the ideas expressed herein and are not meant to limit the scope of the present invention. Further, various technical terms are used throughout this description. An illustrative resource that describes various aspects of these terms can be found in Newton's Telecom Dictionary, 27$^{th}$ Edition (2012). The following is a list of relevant acronyms:

BS Base Station
CDMA Code Division Multiple Access
DL Downlink
EnodeB Evolved Node B
GIS Geographic Information System
2GPP 2$^{nd}$ Generation Partnership Project
3GPP 3$^{rd}$ Generation Partnership Project GPRS General Packet Radio Service
GPS Global Positioning System
GSM Global System for Mobile Communications
LTE Long-Term Evolution
MD Mobile Device
MU-MIMO Multiple User Multiple Input Multiple Output
RCPI Received Channel Power Indicator
RF Radio-Frequency
RRH Remote Radio Head
RRU Remote Radio Unit
RSRQ Reference Signal Receive Quality
RSSI Received Signal Strength Indicator
SINR Signal-to-Interference-Plus-Noise Ratio
UL Uplink
WCDMA Wideband Code Division Multiple Access

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of the claims. Rather, the claimed subject matter might be embodied in other ways, to include different steps or combinations of steps similar to the ones described in this document, and in conjunction with other present or future technologies. Moreover, although the terms "step" and/or "block" may be used herein to connote different elements of various methods employed, the terms should not be interpreted as implying any particular order among or between various steps or blocks unless and except when the order of individual steps or blocks is explicitly described or required.

At a high level, the present invention generally relates to methods and systems for intelligent radiation selection for antennas at a cell site. More specifically, the methods and systems utilize a radio and an antenna that are communicatively coupled to each other, and one or more input components positioned and configured to receive information on at least one of an internal or an external condition of the antenna (e.g., information on movement, position, and/or temperature of the antenna) that may affect network coverage, or rather, may affect a size, orientation, and/or pattern of radiation emitted from the antenna. The information from the input components may be provided continuously to the radio, so that the radio may utilize the information to dynamically modify the signal to the antenna to adjust an area of coverage of the antenna, or rather, adjust a size, orientation, and/or pattern of radiation emitted from the antenna, to compensate for the internal and external conditions associated with the antenna that affect the area of coverage, and to improve and/or at least partially maintain network coverage of the antenna at the cell site. Modification of the signal may be accomplished in a variety of ways, including by adjusting or shifting the amplitude, phase, frequency, and/or power of the signal sent from the radio to the antenna, to adjust the pattern of radiation emitted from the antenna. Devices, components, systems, and methods that accomplish the intelligent radiation selection referenced herein are described further in the following sections.

Figure 1:
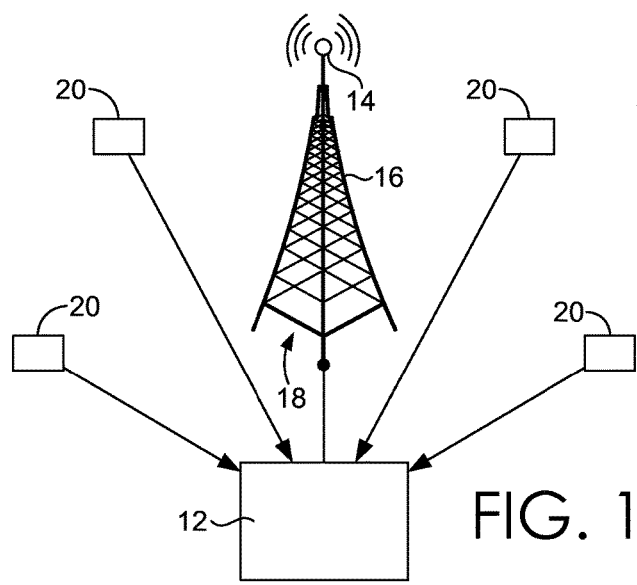
FIG. 1 is an exemplary wireless communications system configured for intelligent radiation selection, in accordance with an embodiment of the present invention.

Referring now to FIG. 1, an exemplary wireless communications system 10 configured for intelligent radiation selection is provided, in accordance with an embodiment of the present invention. In FIG. 1, a radio 12, an antenna 16, and one or more input components 20 are provided. The radio 12 is configured for generating and/or amplifying a signal and sending it to the antenna 16. The antenna 16 is configured to broadcast the signal from a cell site 18 through a broadcasting component 14 (e.g., one or more EnodeBs). The pattern of radiation emitted from the antenna 16 may be adjusted during set-up to achieve a particular area, pattern, or arc of network coverage.

However, as discussed, the coverage area of the cell site 18 may change or diminish when internal and/or external conditions associated with the antenna 16 alter the position, orientation, and/or emitted radiation of the antenna 16 (e.g., wind, terrain, and/or ambient/internal temperature). As shown in FIG. 1, multiple input components 20 are positioned in proximity to the antenna 16. The input components 20 provide information on at least one of an internal and an external condition of the antenna 16 and communicate the information to the radio 12. The radio 12 utilizes the information to adjust the signal sent to the antenna 16 to modify an emitted pattern of radiation from the antenna 16, in order to at least partially recover or maintain an area of network coverage of the antenna 16. The information from the input components 20 may individually or collectively inform the changes to the signal made by the radio 12, and may be weighted or utilized to provide the most effective changes.

Figure 2A:
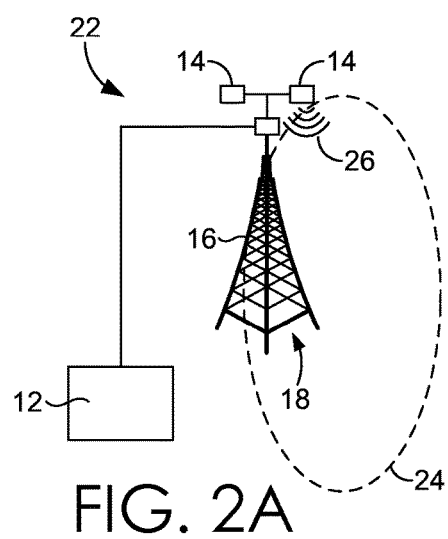
FIG. 2A is an exemplary serving cell with preconfigured network coverage, in accordance with an embodiment of the present invention.

Referring now to FIG. 2A, an exemplary serving cell 22 with pre-configured network coverage 24 is provided, in accordance with an embodiment of the present invention. In FIG. 2A, the radio 12 is shown communicatively coupled to the antenna 16, with the antenna 16 providing a preconfigured area of network coverage 24 from the emitted signal radiation 26 from the broadcast component(s) 14 of the antenna 16. The preconfigured area of network coverage 24 is shown as an oval in FIG. 2A, and is shown prior to any change in coverage due to internal or external conditions affecting the performance of the antenna 16.

Figure 2B:
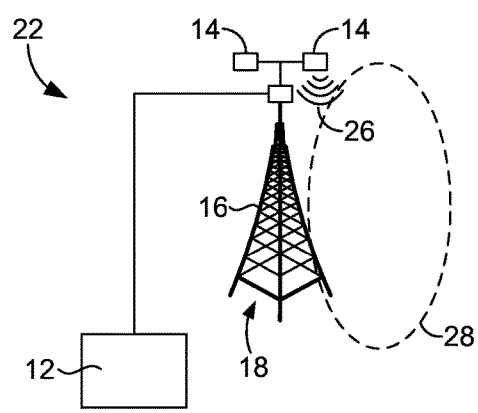
FIG. 2B is the serving cell of FIG. 2A with reduced network coverage due to one or more internal or external conditions associated with the antenna, in accordance with an embodiment of the present invention.

Referring now to FIG. 2B, the serving cell 22 of FIG. 2A is shown with a reduced area of network coverage 28 due to one or more changed internal or external conditions associated with the antenna 16, in accordance with an embodiment of the present invention. As discussed in relation to FIGS. 1 and 2A, the network coverage 24 of the serving cell 22 in FIG. 2A, or rather, the emitted signal radiation 26 from the antenna 16 at the serving cell 22 in FIG. 2A, is affected by the internal or external conditions discussed herein (e.g., change in the position or orientation of the antenna 16 due to wind, temperature, or human interference, among other factors). As a result, the emitted signal radiation 26 changes and in FIG. 2B, the network coverage 28 is reduced compared to the original, preconfigured network coverage 24 shown in FIG. 2A. As a result, wireless network performance is diminished, as represented by the difference between FIGS. 2A and 2B.

Figure 2C:
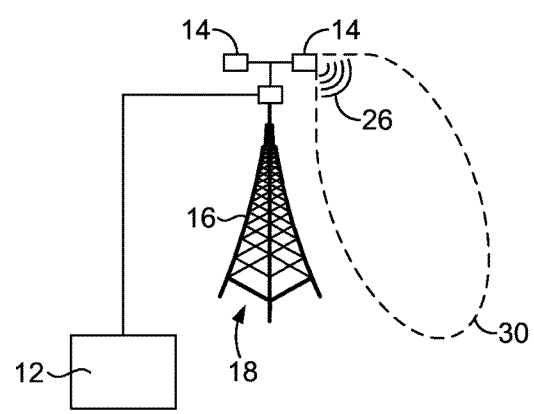
FIG. 2C is the serving cell of FIG. 2A with reduced network coverage and altered coverage orientation due to one or more internal or external conditions associated with the antenna, in accordance with an embodiment of the present invention.

Referring now to FIG. 2C, the serving cell 22 of FIG. 2A is shown with a further altered area of network coverage 30, in accordance with an embodiment of the present invention. In FIG. 2C, the network coverage 30, or rather, the emitted signal radiation 26 from the antenna 16 in FIG. 2C, is once again altered due to an internal or external condition associated with the antenna 16. Additionally, the angle of the emitted signal radiation 26 from the antenna 16 is altered (e.g., by wind moving the structure of the antenna 16). By continuously receiving information from the input components 20 and utilizing such information to dynamically adjust the signal from the radio 12 to the antenna 16, the network coverage 24 shown in FIG. 2A may be at least partially recovered or maintained from the network coverage 30 shown in FIG. 2C.

Figure 3:
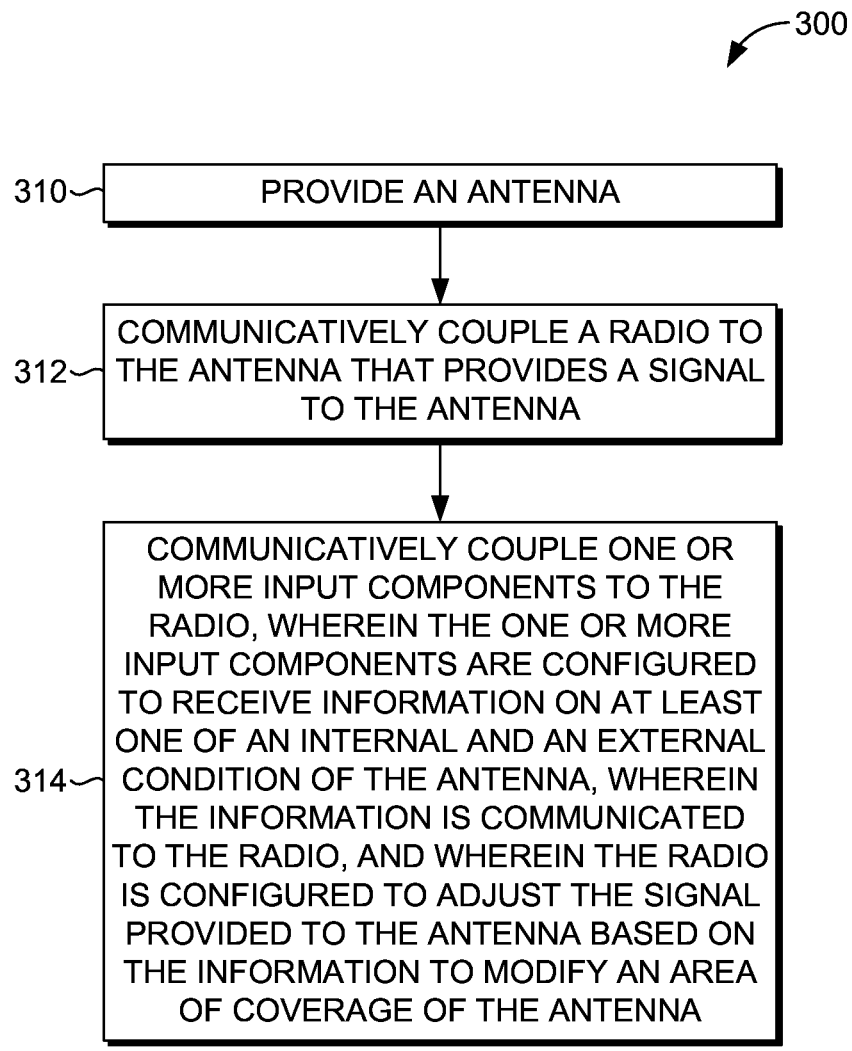
FIG. 3 is a block diagram of an exemplary method for providing improved antenna coverage in wireless communications networks, in accordance with an embodiment of the present invention.

Referring now to FIG. 3, a block diagram of a first exemplary method 300 for providing improved antenna coverage in wireless communications networks is provided, in accordance with an embodiment of the present invention. At a first block 310, an antenna, such as the antenna 16 shown in FIG. 1, is provided. At a second block 312, a radio, such as the radio 12 shown in FIG. 1, is communicatively coupled to the antenna with the radio providing a signal to the antenna. At a third block 314, one or more input components, such as the input components 20 shown in FIG. 1, are communicatively coupled to the radio. The input components are configured to receive information on at least one of an internal and an external condition of the antenna, such as velocity, temperature, or gyroscopic orientation of the antenna, for example. The information is communicated to the radio, and the radio is configured to adjust the signal provided to the antenna based on the information to modify an area of coverage of the antenna.

Figure 4:
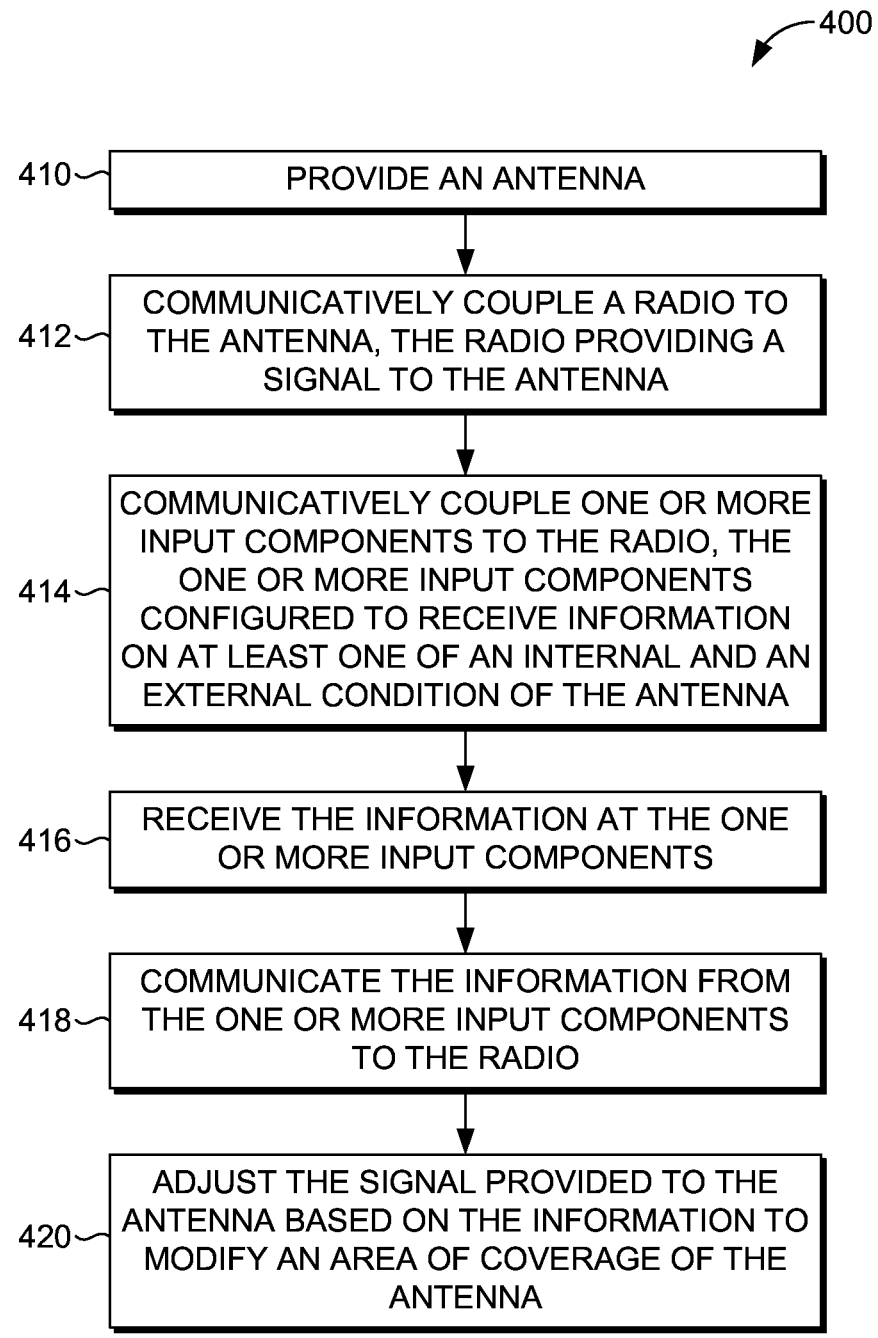
FIG. 4 is a block diagram of an exemplary method for controlling antenna radiation in wireless communications networks, in accordance with an embodiment of the present invention.

Referring now to FIG. 4, a block diagram of a second exemplary method 400 of controlling antenna radiation in wireless communications networks is provided, in accordance with an embodiment of the present invention. At a first block 410, an antenna, such as the antenna 16 shown in FIG. 1, is provided. At a second block 412, a radio, such as the radio 12 shown in FIG. 1, is communicatively coupled to the antenna, the radio providing a signal to the antenna. At a third block 414, one or more input components, such as the input components 20 shown in FIG. 1, are communicatively coupled to the radio, the input components configured to receive information on at least one of an internal and an external condition of the antenna. At a fourth block 416, the information is received at the one or more input components. At a fifth block 418, the information is communicated from the one or more input components to the radio. At a sixth block 420, the signal provided to the antenna is adjusted based on the information to modify an area of coverage, such as the area of coverage 24 or 28 shown in FIGS. 2A and 2B, respectively, of the antenna.

Figure 5:
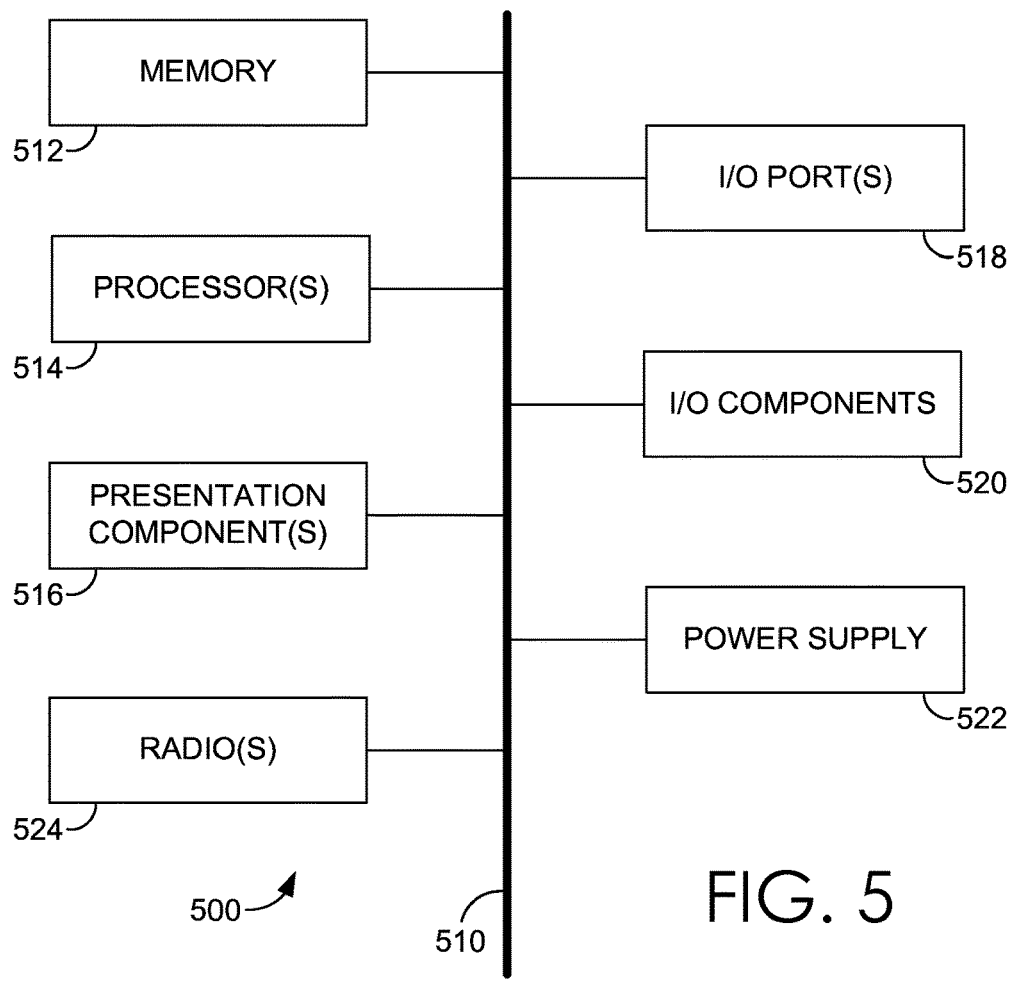
FIG. 5 is an exemplary computer environment associated with intelligent radiation selection in wireless communications networks, in accordance with an embodiment of the present invention.

In FIG. 5, an exemplary operating environment which can be used for implementing embodiments described herein is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or a combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in any variety of system configurations, including hand-held devices, consumer electronics, general-purpose computers, and more specialty computing devices, among others. The invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output (I/O) ports 518, I/O components 520, and an illustrative power supply 522. Bus 510 represents what may be one or more busses (such as an address bus, data bus, or a combination thereof). Although the various blocks of FIG. 5 are shown with lines for the sake of clarity, in reality, delineating various components is not as clear, and metaphorically, the lines are blurred. For example, one may consider a presentation component such as a display device to be an I/O component. Also, processors have memory. The diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated as within the scope of FIG. 5 and when referencing the "computing device."

Computing device 500 may include a variety of computer-readable media and/or computer storage media. Computer-readable media may be any available media that can be accessed by computing device 500 and includes both volatile and nonvolatile media, removable and non-removable media. By way of example and not limitation, computer-readable media may comprise computer storage media and communication media and/or devices. Computer storage media may include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. These memory components can store data momentarily, temporarily, or permanently. Computer storage media does not include signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors 514 that read data from various entities such as memory 512 or I/O components 520. Presentation component(s) 516 present data indications to a user or other device. Exemplary presentation components include a display device, speaker, printing component, vibrating component, etc. I/O ports 518 allow computing device 500 to be logically coupled to other devices including I/O components 520, some of which may be built-in. Illustrative components include a microphone, joystick, game pad, satellite dish, scanner, printer, wireless device, and the like.

Embodiments of the technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media or devices.

Figure 6:
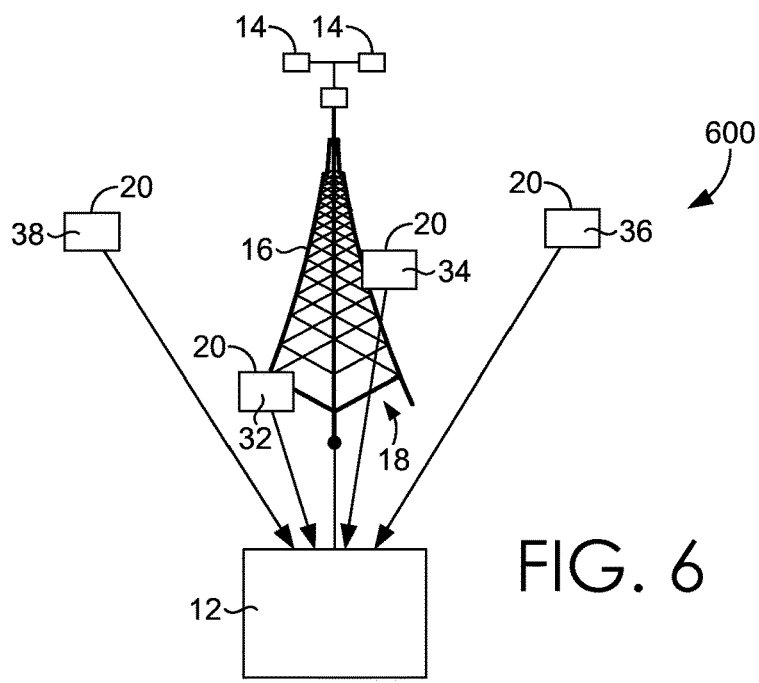
FIG. 6 is an exemplary wireless communications system configured for intelligent radiation selection based on information from multiple input components, in accordance with an embodiment of the present invention.

Referring now to FIG. 6, an exemplary wireless communications system 600 configured for intelligent radiation selection is provided, in accordance with an embodiment of the present invention. In FIG. 6, the system 600 once again includes the radio 12 communicatively coupled to the antenna 16 such that the radio 12 can send a signal to the antenna 16 for broadcast over a wireless communications network. Additionally, as discussed with respect to FIG. 1, multiple input components 20 are positioned or rather, utilized, around the antenna 16 to provide information regarding changes to at least one of internal and external conditions of the antenna 16. In this respect, the input components 20 are shown in various positions and configurations for providing varying types of information to the radio 12 from various locations in and around the antenna 16.

In this regard, in FIG. 6, a first input component 32 is positioned at a base of the antenna 16, and may be used to provide direct or indirect feedback on changes at the base of the antenna 16 (e.g., movement, temperature, etc.). A second input component 34 is positioned further up the antenna 16 to provide direct or indirect feedback on changes higher on the structure of the antenna 16. Finally, third and fourth input components 36, 38 are positioned apart from the antenna 16 but in relatively close proximity to the structure of the antenna 16 in order to provide information on conditions near the antenna 16 (e.g., wind velocity or temperature in the general surrounding environment of the antenna 16). All of the information gathered by the input components 32, 34, 36, 38 may be communicated, continuously or intermittently, to the radio 12 for use in determining an appropriate adjustment to the signal provided to the antenna 16 in order to at least partially recover or maintain a desired area of network coverage.

The placement of the input components 20 in FIG. 6 is merely exemplary, and additional or varied placements, and any variety of components (e.g., detectors, sensors, readers, etc.), may be utilized to provide the most accurate and useful feedback for the radio 12. Additionally, the input components 20 may be selected based on the needs of a particular location (e.g., wind, heat, ground shifting, etc.), and some or all of the information from the distinct input components 32, 34, 36, 38 may be used, if needed.

One input component that may be used to communicate information to the radio may be a level finder or similar gyroscopic device, or other movement detecting component, that is coupled to at least a portion of the antenna (e.g., the broadcasting component 14 on top of the antenna 16 shown in FIG. 6). The leveling or gyroscopic information provided from the device may allow the radio to adjust the signal to the antenna to compensate for movement or changes in position of at least a portion of the antenna. The pattern of radiation may be adjusted in multiple planes, as needed, to help maintain the desired coverage area (e.g., in the x-, y-, and z-plane).

Additionally exemplary input components that may provide information on internal or external conditions of the antenna may include: gyroscopic sensors, leveling sensors, temperature sensors (internal or external, or rather, sensors that provide a temperature of a component of the antenna or a temperature external to the antenna), wind velocity sensors, movement velocity sensors, electromagnetic detection sensors, barometric sensors, wind pressure and velocity sensors, or other mechanical, electrical, and/or thermal input components, devices, and/or sensors. Other input components that measure conditions that may affect the quality of coverage of the antenna, or rather the beam shape, pattern, or area of coverage provided by the emitted signal radiation from the antenna, are possible and contemplated.

Additionally, input components that measure a strength, quality, and/or presence of the signal emitted from the antenna may also be utilized to provide feedback on the signal strength or signal pattern. In this respect, the feedback may include where the emitted radiation is being broadcast, how strong the emitted signal is, and/or the presence or absence of the signal, to inform the signal modification by the radio. Each input component may be configured to provide direct or indirect feedback of the antenna (for example, direct feedback may be a measurement of temperature or movement of the antenna itself; indirect feedback may be a measurement of temperature or movement around the antenna but not directly touching the antenna).

In one variation, the antenna itself, or a component thereof, may be directly or physically adjusted in response to received information from the input components to compensate for internal and external conditions of the antenna. However, as the antenna may often be a passive radio frequency device, adjusting the emitted radiation pattern may be more efficiently accomplished through adjusting only the signal provided from the radio to the antenna, or through adjusting the signal and the antenna position together. In this respect, the radio frequency power, amplitude, frequency, and/or phase, or another aspect of the signal, maybe be adjusted to modify the signal and shape of the emitted radiation pattern from the antenna. This modification to the signal may help adjust and/or shape the beam to at least partially recover the altered radiation pattern, including without actual physical adjustments to the antenna. The components and signal processing may be configured to occur quickly enough so as not to interrupt on-going activity between mobile devices and the radio/antenna. Signal adjustments may be particularly useful in heterogeneous networks, or rather, networks that include macro and small cells. The signal adjustment may occur based on direct information, indirect information, or patterns of information (e.g., movement patterns) associated with internal or external conditions of the antenna.

Continuously or dynamically providing information on internal and external conditions of the antenna through mechanical, electrical, and atmospheric inputs, and adjusting the signal from the radio to the antenna based on the same information, may reduce the amount of effort and equipment required for securing the antenna at set-up to otherwise limit such loss of coverage, and also may provide improved performance from a cell site, and longer reliable use of a cell site. This is particularly true of small cell sites that may have fewer or less robust anchoring components for their antennas (e.g., where antennas are secured only at the antenna base). Modifying an area of coverage, as used in this disclosure, may include adjusting an emitted pattern of radiation from a broadcasting component associated with an antenna at a cell site to adjust a size, angle, cross-sectional area, and/or orientation of the pattern of radiation to influence the network coverage provided by the antenna.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. A method for providing coverage in a wireless communications network, the method comprising:
    broadcasting a sector of coverage from a stationary cell site,
        the stationary cell site comprising:
            at least one radio,
            at least one antenna,
            at least one input component affixed to the stationary cell site, wherein the sector of coverage is broadcast from the antenna using a signal generated by the at least one radio;
    receiving, at the at least one radio, information from the at least one input component indicating a change in at least one of an internal and an external condition of the antenna, the change resulting in the sector of coverage adjusting from a first coverage footprint to a second coverage footprint; and
    modifying the signal from the at least one radio to modify the broadcasted sector of coverage to at least partially recover the first coverage footprint, wherein modifying the signal comprises modifying at least two of the following:
        a power of the signal,
        a frequency of the signal,
        a phase shift of the signal, and
        an amplitude of the signal.

2. The method of claim 1, wherein modifying the signal changes a pattern of radiation emitted from the at least one antenna in at least one of a horizontal plane and a vertical plane relative to the at least one antenna.

3. The method of claim 1, wherein the at least one radio is configured to dynamically modify the signal based on the information received from the at least one input component.

4. The method of claim 1, wherein the at least one input component comprises a gyroscopic device coupled to the at least one antenna that provides at least one of position and orientation information for the at least one antenna.

5. The method of claim 1, wherein the at least one input component comprises a movement detecting component, and wherein the at least one radio is configured to modify the signal based on at least one of:
    direct movement information of the antenna received from the movement detecting component; and
    patterns of movement information of the antenna received from the movement detecting component.

6. The method of claim 1, wherein the at least one internal or external condition comprises at least one of:
    a temperature of a component of the at least one antenna;
    an atmospheric temperature;
    a barometric pressure;
    a position of the at least one antenna; and
    a velocity of the at least one antenna.

7. A method for providing a stationary cell site configured to maintain coverage in a wireless communications network, the method comprising:
    attaching at least one input component to the stationary cell site or a fixed location apart from the stationary cell site,
        the stationary cell site comprising an antenna and a radio communicatively coupled to the antenna,
        the radio configured to generate a signal that is broadcast by the antenna to provide a sector of coverage,
        the at least one input component configured to detect at least one internal condition of the antenna,
    communicating information from the at least one input component to the radio; and
    modifying the signal provided to the antenna from the radio based on the information from the at least one input component.

8. The method of claim 7, wherein the at least one input component comprises a movement detecting component that provides at least one of a position and an orientation of the antenna.

9. The method of claim 7, wherein the at least one internal condition comprises at least one of:
    a temperature of a component of the antenna;
    a position of the antenna; and
    a velocity of the antenna.

10. The method of claim 7, wherein the at least one input component is mounted on at least one of:
    a structure of the stationary cell site upon which the antenna is mounted; and
    the antenna.

11. The method of claim 7, wherein the at least one input component is a gyroscopic device.

12. The method of claim 7, wherein the at least one input component comprises a plurality of input components at separate locations, wherein the information communicated to the radio includes information from each of the plurality of input components.

13. The method of claim 12, wherein the information from each of the plurality of input components is weighted, and wherein the signal is further modified based on the weighting of the information from the plurality of input components.

14. A system for providing coverage in a wireless communications network, the system comprising:
- a stationary cell site comprising:
  - a radio, and
  - an antenna, the antenna configured to broadcast a sector of coverage using a signal generated by the radio; and
- at least one input component positioned in fixed relation relative to the stationary cell site, the at least one input component configured to provide information on at least one of an internal and an external condition of the antenna,
- wherein the radio is configured to modify the signal provided to the antenna based on the information to modify a footprint of the broadcasted sector of coverage, wherein modifying the signal comprises modifying at least two of the following:
  - a power of the signal,
  - a frequency of the signal,
  - a phase shift of the signal, and
  - an amplitude of the signal.

15. The system of claim 14, wherein the at least one input component comprises a movement detecting component coupled to the stationary cell site, and wherein the radio is configured to modify the signal based on movement information from the movement detecting component.

16. The system of claim 14, wherein the at least one input component is coupled to:
- the stationary cell site; or
- a fixed location apart from the stationary cell site.

17. The system of claim 14, wherein the at least one internal or external condition comprises at least one of:
- a temperature of a component of the antenna;
- an atmospheric temperature;
- a barometric pressure;
- a position of the antenna; and
- a velocity of the antenna.

18. The system of claim 14, wherein the at least one input component comprises a gyroscopic device coupled to the antenna.

19. The system of claim 14, wherein modifying of the signal comprises modifying the power of the signal, the frequency of the signal, and the amplitude of the signal.

* * * * *